US005922037A

United States Patent [19]

Potts

[11] Patent Number: 5,922,037

[45] Date of Patent: Jul. 13, 1999

[54] WIRELESS SYSTEM FOR DIAGNOSING EXAMINATION AND PROGRAMMING OF VEHICULAR CONTROL SYSTEMS AND METHOD THEREFOR

[75] Inventor: Kenneth M. Potts, Gilbert, Ariz.

[73] Assignee: VLSI Technology, Inc., San Jose, Calif.

[21] Appl. No.: 08/719,844

[22] Filed: Sep. 30, 1996

[51] Int. Cl.[6] .................................................... H04B 1/38

[52] U.S. Cl. ............................... 701/29; 701/35; 73/117.3

[58] Field of Search .................................... 701/2, 24, 29, 701/33, 35; 73/117.3; 340/436, 430

[56] References Cited

U.S. PATENT DOCUMENTS 4,738,133 4/1988 Bredkel et al. ........................ 73/117.3
5,442,553 8/1995 Parrillo ...................................... 701/35

*Primary Examiner*—William A. Cuchlinski, Jr.
*Assistant Examiner*—Arthur Donnelly
*Attorney, Agent, or Firm*—Harry M. Weiss; Jeffrey D. Moy; Harry M. Weiss & Associates, P.C.

[57] ABSTRACT

A wireless interface for diagnostic examination and programming of vehicular control systems. The wireless interface uses a vehicle processor which is coupled to at least one of a plurality of vehicular control systems. The vehicle processor is used for monitoring and controlling the different vehicular control systems located in the vehicle. A first transceiver is coupled to the vehicle processor for sending and receiving programming signals and operating signals to and from the vehicle processor. A second transceiver is provided for sending the programming signals to the first transceiver and for receiving the operating signals sent from the first transceiver. A test unit processor is coupled to the second transceiver for supplying the programming signals sent to the vehicle processor via the second transceiver and the first transceiver and for receiving the operating signals sent from the vehicle processor via the first transceiver and the second transceiver to monitor operation of the different vehicular control systems in the vehicle.

20 Claims, 1 Drawing Sheet

WIRELESS SYSTEM FOR DIAGNOSING EXAMINATION AND PROGRAMMING OF VEHICULAR CONTROL SYSTEMS AND METHOD THEREFOR

BACKGROUND OF THE INVENTION

1. Field of the Invention

This invention relates to vehicular test equipment and, more specifically, to a wireless communication system which may be used for diagnostic examination and programming of vehicular control systems.

2. Description of the Prior Art

In the past, in the automotive industry, diagnostic evaluation of a vehicle control system was performed through the use of test equipment which was directly coupled to a specific control system to be tested. Over time, vehicle control systems became more and more complex. One reason for the increase complexity is due to computerization of the control systems. Today, most vehicles have one or more microcontrollers which are used to control the operation of a plurality of control systems located within the vehicle. However, on board diagnostics are still accessed through the use of test equipment which require that the test connectors be directly coupled to the microcontroller or to the control system to be tested. As vehicle control systems continue to become more complex, the cost of providing enough connections to properly observe the control system is becoming cost prohibitive. Furthermore, after repeated interrogation connector cycles, the connectors have a tendency to lose strength and fail thereby causing false and misleading diagnostics.

Therefore, a need existed to provide an improved system and method for diagnostic evaluation of vehicle control systems. The improved system and method must provided a wireless two way interface between the test equipment and a vehicle's on board computer system (i.e., microcontrollers that control the vehicle control systems). The wireless two way interface would allow for a reliable, dynamic, diagnostic environment as well as provide a link to program the vehicle's on board computer system.

SUMMARY OF THE INVENTION

In accordance with one embodiment of the present invention, it is an object of the present invention to provide an improved system and method for diagnostic evaluation of vehicle control systems.

It is another object of the present invention to provide an improved system and method for diagnostic evaluation of vehicle control systems that provides a wireless two way interface between the test equipment and a vehicle's on board computer system.

It is still another object of the present invention to provide a wireless two way interface which would allow for a reliable, dynamic, diagnostic environment as well as provide a link to program the vehicle's on board computer system.

BRIEF DESCRIPTION OF THE PREFERRED EMBODIMENTS

In accordance with one embodiment of the present invention, a wireless interface for diagnostic examination and programming of vehicular control systems is disclosed. The wireless interface is comprised of vehicle processor means coupled to at least one of a plurality of vehicular control systems for monitoring and controlling at least one of the plurality of vehicular control systems. First transceiver means are coupled to the vehicle processor means for receiving programming signals and for sending the programming signals to the vehicle processor means to program the vehicle processor means and for receiving operating signals from the vehicle processor means to monitor operation of at least one of the plurality of vehicular control systems. Second transceiver means are provided for sending the programming signals to the first transceiver means and for receiving the operating signals sent from the first transceiver means. Test unit processor means are coupled to the second transceiver means for sending the programming signals to the vehicle processor means through the second transceiver means and the first transceiver means to program and test at least one of the plurality of vehicular control systems and for receiving the operating signals sent from the vehicle processor means through the first transceiver means and the second transceiver means to monitor operation of at least one of the plurality of vehicular control systems.

In accordance with another embodiment of the present invention, a method of providing a wireless interface for diagnostic examination and programming of vehicular control systems is disclosed. The method comprises the steps of: providing vehicle processor means coupled to at least one of a plurality of vehicular control systems for monitoring and controlling at least one of the plurality of vehicular control systems; providing first transceiver means coupled to the vehicle processor means for receiving programming signals and for sending the programming signals to the vehicle processor means to program the vehicle processor means and for receiving operating signals from the vehicle processor means to monitor operation of at least one of the plurality of vehicular control systems; providing second transceiver means for sending the programming signals to the first transceiver means and for receiving the operating signals sent from the first transceiver means; and providing test unit processor means coupled to the second transceiver means for sending the programming signals to the vehicle processor means through the second transceiver means and the first transceiver means to program and test at least one of the plurality of vehicular control systems and for receiving the operating signals sent from the vehicle processor means through the first transceiver means and the second transceiver means to monitor operation of at least one of the plurality of vehicular control systems.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
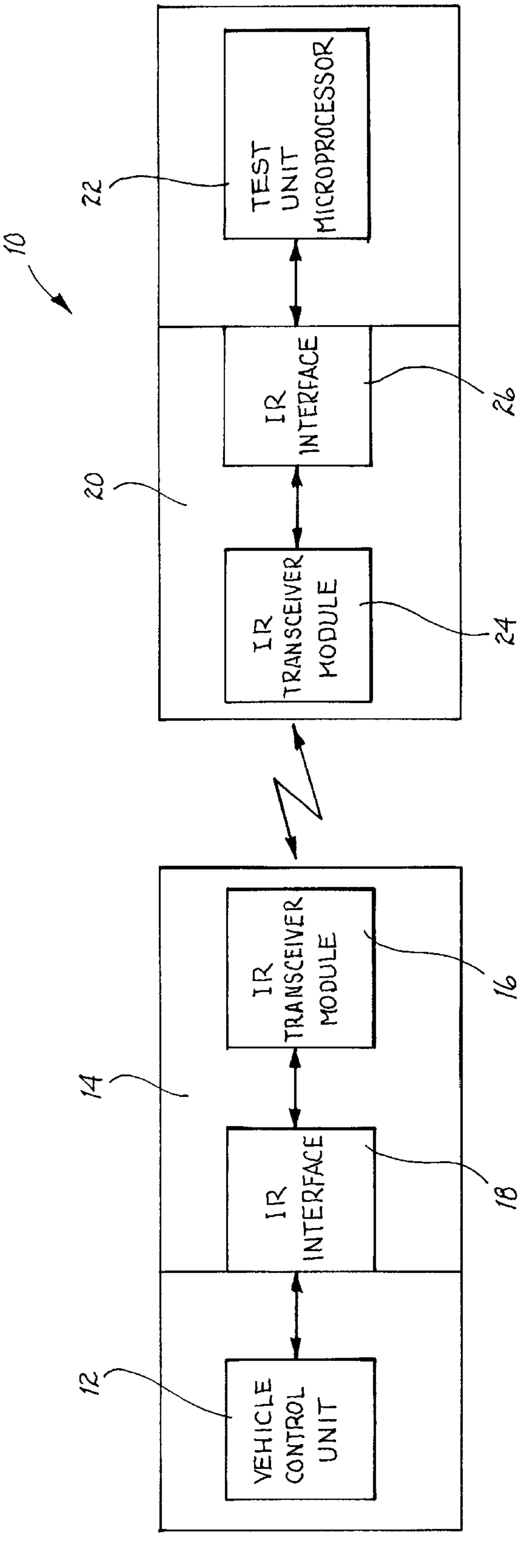
FIG. 1 is a simplified functional block diagram of the wireless interface of the present invention for diagnostic examination and programming of vehicular control systems.

Referring to FIG. 1, a wireless interface for diagnostic examination and programming of vehicular control systems 10 (hereinafter wireless interface 10) is disclosed. The wireless interface 10 is comprised of a plurality of elements one of which is a vehicle control unit 12. The vehicle control unit 12 is coupled to one or more vehicle control systems which are located in the vehicle to be tested. The vehicle control unit 12 is used for controlling and monitoring the operation of each vehicle control system that is coupled to it.

A first transceiver 14 is coupled to the vehicle control unit 12. The first transceiver 14 is used for sending and receiving signals to and from the vehicle control unit 12. In a monitoring mode, the first transceiver 14 will receive signals sent by the vehicle control unit 12 and will transmit these signals to a monitoring station for an individual working on the vehicle to monitor the operation of the vehicle control system in question. In a programming mode, the first transceiver 14 will receive signals sent by a programming device and will transmit these signals to the vehicle control unit 12 in order to program the operation of the vehicle control unit 12 or to program different test programs in the vehicle control unit 12 in order to exercise the various vehicle control systems in question. In the preferred embodiment of the present invention, the first transceiver 14 is a high bandwidth two way infrared transceiver.

The first transceiver 14 is comprised of an infrared transceiver module 16 and an infrared interface 18. The infrared transceiver module 16 is used for sending and receiving infrared signals sent to and from a second transceiver 20. The infrared interface 18 is coupled between the infrared transceiver module 16 and the vehicle control unit 12. The infrared interface 18 is used for encoding and decoding infrared signals. In the preferred embodiment of the present invention, the infrared interface 18 is a Fast Infrared (FIR) interface which is IrDA version 1.2 compliant.

When the wireless interface 10 is placed in a monitoring mode, the vehicle control unit 12 will send signals carrying information on the operating condition of a specific vehicle control system. The infrared interface 18 will encode the signals as infrared pulses and will send the infrared pulses to the infrared transceiver module 16. The infrared transceiver module 16 will then transmit the infrared pulses to the second transceiver 20 which is coupled to a testing module for monitoring the operating of the vehicle control system in question.

When the wireless interface 10 is placed in a programming mode, the infrared transceiver module 16 will receive programming infrared pulses sent from the second transceiver 20. The infrared transceiver module 16 will send the programming infrared pulses to the infrared interface 18. The infrared interface 18 will decode the programming infrared pulses and will send a programming signal to the vehicle control unit 12 in order to program the operation of a specific vehicle control system or to program different test programs in the vehicle control unit 12 in order to exercise the various vehicle control systems in question.

As stated above, the wireless interface 10 is comprised of a second transceiver 20. The second transceiver 20 is used for sending and receiving signals to and from a test unit microprocessor 22. In a monitoring mode, the second transceiver 20 will receive signals sent by the vehicle control unit 12 via the first transceiver 14 and will transmit these signals to the test unit microprocessor 22 in order to allow an individual working on the vehicle to monitor the operation of the vehicle control system in question. In a programming mode, the second transceiver 20 will receive programming signals sent by the test unit microprocessor 22 and will transmit these programming signals to the vehicle control unit 12 via the first transceiver 14 in order to program the operation of the vehicle control unit 12 or to program different test programs in the vehicle control unit 12 in order to exercise the various vehicle control systems in question. In the preferred embodiment of the present invention, the second transceiver 20 is a high bandwidth two way infrared transceiver.

Like the first transceiver 14, the second transceiver 20 is comprised of an infrared transceiver module 24 and an infrared interface 26. The infrared transceiver module 24 is used for sending and receiving infrared signals sent to and from the first transceiver 14. The infrared interface 26 is coupled between the transceiver module 24 and the test unit microprocessor 22. The infrared interface 26 is used for encoding and decoding infrared signals. In the preferred embodiment of the present invention, the infrared interface 26 is a Fast Infrared (FIR) interface which is IrDA version 1.2 compliant.

When the wireless interface 10 is placed in a monitoring mode, the vehicle control unit 12 will send signals carrying information on the operating condition of a specific vehicle control system. The infrared interface 18 will encode the signals as infrared pulses and will send the infrared pulses to the infrared transceiver module 16. The infrared transceiver module 16 will then transmit the infrared pulses to the second transceiver 20. The infrared transceiver module 24 receives the transmitted infrared pulses sent from the first transceiver 14 and will send the infrared pulses to the infrared interface 26. The infrared interface 26 decodes the infrared pulses and sends a signal to the test unit microprocessor 22. The test unit microprocessor 22 is generally part of a testing unit which will allow an individual to monitor the operating conditions of the vehicle control system in question.

When the wireless interface 10 is placed in a programming mode, the test unit microprocessor 22 will send a programming signal to the infrared interface 26. The programming signal will be used to program different test programs to the vehicle control unit 12 to exercise the various vehicle control systems under question in order to enable quicker diagnosis by an individual. The programming signal may also be used to program the vehicle control unit 12 in order to alter the current operating condition of a specific vehicle control system. The programming signal will be encoded as infrared pulses by the infrared interface 26 and will be sent to the infrared transceiver module 24. The infrared transceiver module 24 will then send the programming infrared pulses to the first infrared transceiver 14. The infrared transceiver module 16 will receive the programming infrared pulses and will send the infrared pulses to the infrared interface 18. The infrared interface 18 will decode the programming infrared pulses and will send a programming signal to the vehicle control unit 12 in order to program the vehicle control unit 12.

The wireless interface 10 can be used for interrogation/programming of various vehicle control systems. The first transceiver 14 can be integrated into any microprocessor based system. In the case of motorized vehicles, the first transceiver 14 can be mounted in the grille area of the vehicle in order to provide a two-way link to the onboard microprocessor (i.e., vehicle control unit 12). The wireless interface 10 may be used to check to see if there are any trouble codes in the vehicle control unit 12 indicating problems in the vehicle control systems. The wireless interface 10 may further be used to facilitate vehicle safety/emission compliance by law enforcement officials. In the shop bay, the wireless interface 10 offers the advantages of a wireless connection to diagnostic computers thereby eliminating mechanical test connector failures as well as test cable failures. The transfer rates also allow the test programs to dynamically change the parameters of the vehicle control system under test to diagnose problems.

While the invention has been particularly shown and described with reference to a preferred embodiment thereof, it should be understood by those skilled in the art that changes in form and detail may be made therein without departing from the spirit and scope of the invention.

I claim:

1. A wireless interface for diagnostic examination and programming of vehicular control systems comprising, in combination:

vehicle processor means coupled to at least one of a plurality of said vehicular control systems for monitoring and controlling said at least one of said plurality of said vehicular control systems;

first transceiver means coupled to said vehicle processor means for receiving programming signals and for sending said programming signals to said vehicle processor means to program said vehicle processor means and for receiving operating signals from said vehicle processor means to monitor operation of said at least one of said plurality of said vehicular control systems;

second transceiver means for sending said programming signals to said first transceiver means and for receiving said operating signals sent from said first transceiver means; and test unit processor means coupled to said second transceiver means for sending said programming signals to said vehicle processor means through said second transceiver means and said first transceiver means to program and test said at least one of said plurality of said vehicular control systems and for receiving said operating signals sent from said vehicle processor means through said first transceiver means and said second transceiver means to monitor operation of said at least one of said plurality of said vehicular control systems;

wherein said first transceiver means comprises:

first interface means coupled to said vehicle processor means for receiving said operating signals sent from said vehicle processor means and for encoding said operating signals as operating infrared pulses for said test unit processor means to monitor operation of said at least one of said plurality of said vehicular control systems and for decoding programming infrared pulses sent from said second transceiver means to program said vehicle processor means wherein said first interface means is a Fast Infrared (FIR) interface which is IrDA version 1.2 compliant; and first infrared transceiver module means coupled to said first interface means for sending said operating infrared pulses sent from said first interface means to said second transceiver means for said test unit processor means to monitor operation of said at least one of said plurality of said vehicular control systems and for receiving said programming infrared pulses sent from said second transceiver means to program said vehicle processor means.

2. A wireless interface for diagnostic examination and programming of vehicular control systems in accordance with claim 1 wherein said second transceiver means comprises:

second interface means coupled to said test unit processor means for receiving said programming signals from said test unit processor and for encoding said programming signals as said programming infrared pulses for programming said vehicle unit processor means and for decoding said operating infrared pulses sent from said first transceiver means to monitor operation of said at least one of said plurality of said vehicular control systems; and second infrared transceiver module means coupled to said second interface means for sending said programming infrared pulses sent from said second interface means to said first transceiver means to program said vehicle processor means and for receiving said operating infrared pulses sent from said first transceiver means for said test unit processor means to monitor operation of said at least one of said plurality of said vehicular control systems.

3. A wireless interface for diagnostic examination and programming of vehicular control systems in accordance with claim 2 wherein said second interface means is a Fast Infrared (FIR) interface which is IrDA version 1.2 compliant.

4. A wireless interface for diagnostic examination and programming of vehicular control systems in accordance with claim 1 wherein said vehicle processor means is coupled to a plurality of said vehicular control systems for monitoring and controlling said plurality of said vehicular control systems.

5. A wireless interface for diagnostic examination and programming of vehicular control systems in accordance with claim 4 wherein said first transceiver means coupled to said vehicle processor means for sending signals to and receiving signals from said vehicle processor means to monitor and program said plurality of said vehicular control systems.

6. A wireless interface for diagnostic examination and programming of vehicular control systems in accordance with claim 5 wherein said test unit processor means coupled to said second transceiver means for sending signals to said vehicle processor means via said first transceiver means and said second transceiver means to program and test said plurality of said vehicular control systems and for receiving signals from said vehicle processor means via said first transceiver means and said second transceiver means to monitor operation of said plurality of said vehicular control systems.

7. A wireless interface for diagnostic examination and programming of vehicular control systems comprising, in combination:

vehicle processor means coupled to at least one of a plurality of said vehicular control systems for monitoring and controlling said at least one of said plurality of said vehicular control systems;

first transceiver means coupled to said vehicle processor means for receiving programming signals and for sending said programming signals to said vehicle processor means to program said vehicle processor means and for receiving operating signals from said vehicle processor means to monitor operation of said at least one of said plurality of said vehicular control systems;

second transceiver means for sending said programming signals to said first transceiver means and for receiving said operating signals sent from said first transceiver means;

test unit processor means coupled to said second transceiver means for sending said programming signals to said vehicle processor means through said second transceiver means and said first transceiver means to program and test said at least one of said plurality of said vehicular control systems and for receiving said operating signals sent from said vehicle processor means through said first transceiver means and said second transceiver means to monitor operation of said at least one of said plurality of said vehicular control systems;

wherein said first transceiver means comprises:

first interface means coupled to said vehicle processor means for receiving said operating signals sent from said vehicle processor means and for encoding said operating signals as operating infrared pulses for said test unit processor means to monitor operation of said at least one of said plurality of said vehicular control systems and for decoding programming infrared pulses sent from said second transceiver means to program said vehicle processor means, said first interface means being a Fast Infrared (FIR) interface which is IrDA version 1.2 compliant; and first infrared transceiver module means coupled to said first interface means for sending said operating infrared pulses sent from said first interface means to said second transceiver means for said test unit processor means to monitor operation of said at least one of said plurality of said vehicular control systems and for receiving said programming infrared pulses sent from said second transceiver means to program said vehicle processor means; and wherein said second transceiver means comprises:

second interface means coupled to said test unit processor means for receiving said programming signals from said test unit processor and for encoding said programming signals as said programming infrared pulses for programming said vehicle unit processor means and for decoding said operating infrared pulses sent from said first transceiver means to monitor operation of said at least one of said plurality of said vehicular control systems; and second infrared transceiver module means coupled to said second interface means for sending said programming infrared pulses sent from said second interface means to said first transceiver means to program said vehicle processor means and for receiving said operating infrared pulses sent from said first transceiver means for said test unit processor means to monitor operation of said at least one of said plurality of said vehicular control systems.

8. A wireless interface for diagnostic examination and programming of vehicular control systems in accordance with claim 7 wherein said second interface means is a Fast Infrared (FIR) interface which is IrDA version 1.2 compliant.

9. A method of providing a wireless interface for diagnostic examination and programming of vehicular control systems comprising the steps of:

providing vehicle processor means coupled to at least one of a plurality of said vehicular control systems for monitoring and controlling said at least one of said plurality of said vehicular control systems;

providing first transceiver means coupled to said vehicle processor means for receiving programming signals and for sending said programming signals to said vehicle processor means to program said vehicle processor means and for receiving operating signals from said vehicle processor means to monitor operation of said at least one of said plurality of said vehicular control systems;

providing second transceiver means for sending said programming signals to said first transceiver means and for receiving said operating signals sent from said first transceiver means; and providing test unit processor means coupled to said second transceiver means for sending said programming signals to said vehicle processor means through said second transceiver means and said first transceiver means to program and test said at least one of said plurality of said vehicular control systems and for receiving said operating signals sent from said vehicle processor means through said first transceiver means and said second transceiver means to monitor operation of said at least one of said plurality of said vehicular control systems;

said step of providing said first transceiver means further comprises the steps of:

providing first interface means coupled to said vehicle processor means for receiving said operating signals sent from said vehicle processor means and for encoding said operating signals as operating infrared pulses for said test unit processor means to monitor operation of said at least one of said plurality of said vehicular control systems and for decoding programming infrared pulses sent from said second transceiver means to program said vehicle processor means, wherein said first interface means is a Fast Infrared (FIR) interface which is IrDA version 1.2 compliant; and providing first infrared transceiver module means coupled to said first interface means for sending said operating infrared pulses sent from said first interface means to said second transceiver means for said test unit processor means to monitor operation of said at least one of said plurality of said vehicular control systems and for receiving said programming infrared pulses sent from said second transceiver means to program said vehicle processor means.

10. The method of claim 9 wherein said step of providing second transceiver means further comprises the steps of:

providing second interface means coupled to said test unit processor means for receiving said programming signals from said test unit processor and for encoding said programming signals as said programming infrared pulses for programming said vehicle unit processor means and for decoding said operating infrared pulses sent from said first transceiver means to monitor operation of said at least one of said plurality of said vehicular control systems; and providing second infrared transceiver module means coupled to said second interface means for sending said programming infrared pulses sent from said second interface means to said first transceiver means to program said vehicle processor means and for receiving said operating infrared pulses sent from said first transceiver means for said test unit processor means to monitor operation of said at least one of said plurality of said vehicular control systems.

11. The method of claim 10 wherein said step of providing second interface means further comprises the step of providing a Fast Infrared (FIR) interface which is IrDA version 1.2 compliant.

12. The method of claim 9 wherein said step of providing vehicle processor means further comprises the step of providing vehicle processor means which are coupled to a plurality of said vehicular control systems for monitoring and controlling said plurality of said vehicular control systems.

13. The method of claim 12 wherein said step of providing first transceiver means further comprises the step of providing first transceiver means coupled to said vehicle processor means for sending signals to and receiving signals from said vehicle processor means to monitor and program said plurality of said vehicular control systems.

14. The method of claim 13 wherein said step of providing test unit processor means further comprises the step of providing test unit processor means coupled to said second transceiver means for sending signals to said vehicle processor means via said first transceiver means and said second transceiver means to program and test said plurality of said vehicular control systems and for receiving signals from said vehicle processor means via said first transceiver means and said second transceiver means to monitor operation of said plurality of said vehicular control systems.

15. A wireless interface for diagnostic examination and programming of vehicular control systems comprising, in combination:

a vehicle processor coupled to at least one of a plurality of said vehicular control systems for monitoring and controlling said at least one of said plurality of said vehicular control systems;

a first transceiver coupled to said vehicle processor for receiving programming signals and for sending said programming signals to said vehicle processor to program said vehicle processor and for receiving operating signals from said vehicle processor to monitor operation of said at least one of said plurality of said vehicular control systems;

a second transceiver for sending said programming signals to said first transceiver and for receiving said operating signals sent from said first transceiver; and a test unit processor coupled to said second transceiver for sending said programming signals to said vehicle processor through said second transceiver and said first transceiver to program and test said at least one of said plurality of said vehicular control systems and for receiving said operating signals sent from said vehicle processor through said first transceiver and said second transceiver to monitor operation of said at least one of said plurality of said vehicular control systems;

wherein said first transceiver comprises:

a first interface coupled to said vehicle processor for receiving said operating signals sent from said vehicle processor and for encoding said operating signals as operating infrared pulses for said test unit processor to monitor operation of said at least one of said plurality of said vehicular control systems and for decoding programming infrared pulses sent from said second transceiver to program said vehicle processor, said first interface being a Fast Infrared (FIR) interface which is IrDA version 1.2 compliant; and first infrared transceiver module coupled to said first interface for sending said operating infrared pulses sent from said first interface to said second transceiver for said test unit processor to monitor operation of said at least one of said plurality of said vehicular control systems and for receiving said programming infrared pulses sent from said second transceiver to program said vehicle processor.

16. A wireless interface for diagnostic examination and programming of vehicular control systems in accordance with claim 15 wherein said second transceiver comprises:

a second interface coupled to said test unit processor for receiving said programming signals from said test unit processor and for encoding said programming signals as said programming infrared pulses for programming said vehicle unit processor and for decoding said operating infrared pulses sent from said first transceiver to monitor operation of said at least one of said plurality of said vehicular control systems; and a second infrared transceiver module coupled to said second interface for sending said programming infrared pulses sent from said second interface to said first transceiver to program said vehicle processor and for receiving said operating infrared pulses sent from said first transceiver for said test unit processor to monitor operation of said at least one of said plurality of said vehicular control systems.

17. A wireless interface for diagnostic examination and programming of vehicular control systems in accordance with claim 16 wherein said second interface is a Fast Infrared (FIR) interface which is IrDA version 1.2 compliant.

18. A wireless interface for diagnostic examination and programming of vehicular control systems in accordance with claim 15 wherein said vehicle processor is coupled to a plurality of said vehicular control systems for monitoring and controlling said plurality of said vehicular control systems.

19. A wireless interface for diagnostic examination and programming of vehicular control systems in accordance with claim 18 wherein said first transceiver coupled to said vehicle processor for sending signals to and receiving signals from said vehicle processor to monitor and program said plurality of said vehicular control systems.

20. A wireless interface for diagnostic examination and programming of vehicular control systems in accordance with claim 19 wherein said test unit processor coupled to said second transceiver for sending signals to said vehicle processor via said first transceiver and said second transceiver to program and test said plurality of said vehicular control systems and for receiving signals from said vehicle processor via said first transceiver and said second transceiver to monitor operation of said plurality of said vehicular control systems.

* * * * *